United States Patent
Buchacher et al.

(10) Patent No.: US 9,825,722 B2
(45) Date of Patent: Nov. 21, 2017

(54) COMMUNICATION DEVICE AND METHOD FOR SIGNAL DETERMINATION

(71) Applicant: Intel IP Corporation, Santa Clara, CA (US)

(72) Inventors: Clemens Buchacher, Munich (DE); Joachim Wehinger, Unterhaching (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/356,806

(22) Filed: Nov. 21, 2016

(65) Prior Publication Data
US 2017/0180066 A1    Jun. 22, 2017

(30) Foreign Application Priority Data

Dec. 21, 2015   (DE) .......................... 10 2015 122 458

(51) Int. Cl.
*H04B 17/345*    (2015.01)
*H04L 27/18*    (2006.01)
(Continued)

(52) U.S. Cl.
CPC ........... *H04B 17/345* (2015.01); *H04L 27/18* (2013.01); *H04L 69/22* (2013.01); *H04L 1/0054* (2013.01)

(58) Field of Classification Search
CPC ......... H04B 1/345; H04L 27/18; H04L 69/22; H04L 1/0054
See application file for complete search history.

(56) References Cited

U.S. PATENT DOCUMENTS 7,979,784 B2 * 7/2011 Shao .................... H04L 1/0061
                                                                  375/240.12
2007/0240191 A1 * 10/2007 Singh .................... H04L 1/0061
                                                                  725/81
(Continued)

FOREIGN PATENT DOCUMENTS

WO    2014171872 A1    10/2014
WO    2015026284 A1    2/2015

OTHER PUBLICATIONS

ETSI, Universal Mobile Telecommunications System (UMTS); Multiplexing and channel coding (FDD) (3GPP TS 25.212 version 12.1.0 Release 12), 2015, France.

(Continued)

*Primary Examiner* — Janice Tieu
(74) *Attorney, Agent, or Firm* — Viering, Jenstshura & Partner mbB

(57) ABSTRACT

A communication device is provided that includes a receiver configured to receive a signal. The communication device further includes a determination circuit configured to determine a data packet of the received signal based on a predefined packet structure. The communication device further includes a decoder configured to determine a key information. The decoder is configured to decode a first portion of the data packet based on the key information, to determine a redundancy information of a second portion of the data packet and to verify a packet information of the first portion and the second portion based on the redundancy information. The communication device further includes a detection circuit configured to detect an interference signal of the received signal and to activate the decoder if the interference signal is detected.

25 Claims, 6 Drawing Sheets

(51) Int. Cl.
*H04L 29/06* (2006.01)
*H04L 1/00* (2006.01)

(56) References Cited

U.S. PATENT DOCUMENTS

| | | |
|---|---|---|
| 2010/0260231 A1 | 10/2010 | Ringstom et al. |
| 2010/0309861 A1* | 12/2010 | Gorokhov ............ H04B 1/7103 370/329 |
| 2011/0122927 A1 | 5/2011 | Wang |
| 2012/0189083 A1 | 7/2012 | Reial |
| 2013/0114429 A1 | 5/2013 | Jonsson et al. |
| 2013/0121168 A1 | 5/2013 | Luo et al. |
| 2013/0202063 A1 | 8/2013 | Reial et al. |
| 2013/0279547 A1 | 10/2013 | Jonsson et al. |
| 2014/0229800 A1* | 8/2014 | Eroz .................... H03M 13/13 714/776 |
| 2015/0003509 A1 | 1/2015 | Faber et al. |
| 2015/0055591 A1 | 2/2015 | Kang et al. |

OTHER PUBLICATIONS

German Office Action based on Application No. 10 2015 122 458.5 (8 pages) dated May 25, 2016 (Reference Purpose Only).

* cited by examiner

US 9,825,722 B2

COMMUNICATION DEVICE AND METHOD FOR SIGNAL DETERMINATION

RELATED APPLICATIONS

This application claims priority of German patent application No. 10 2015 122 458.5, filed on Dec. 21, 2015, the entire contents of which are hereby incorporated herein by reference.

TECHNICAL FIELD

The present disclosure relates to communication devices and methods for signal determination.

BACKGROUND

In a scenario, a wireless device receives a signal that may include an interference signal and additive white Gaussian noise. It may be desirable to provide a communication device and a method that may subtract the interference signal in a reliable and efficient manner.

SUMMARY

A communication device is provided that includes a receiver configured to receive a signal. The communication device further includes a determination circuit configured to determine a data packet of the received signal based on a predefined packet structure. The communication device further includes a decoder configured to determine a key information. The decoder is configured to decode a first portion of the data packet based on the key information, to determine a redundancy information of a second portion of the data packet and to verify a packet information of the first portion and the second portion based on the redundancy information. The communication device further includes a detection circuit configured to detect an interference signal of the received signal and to activate the decoder if the interference signal is detected.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
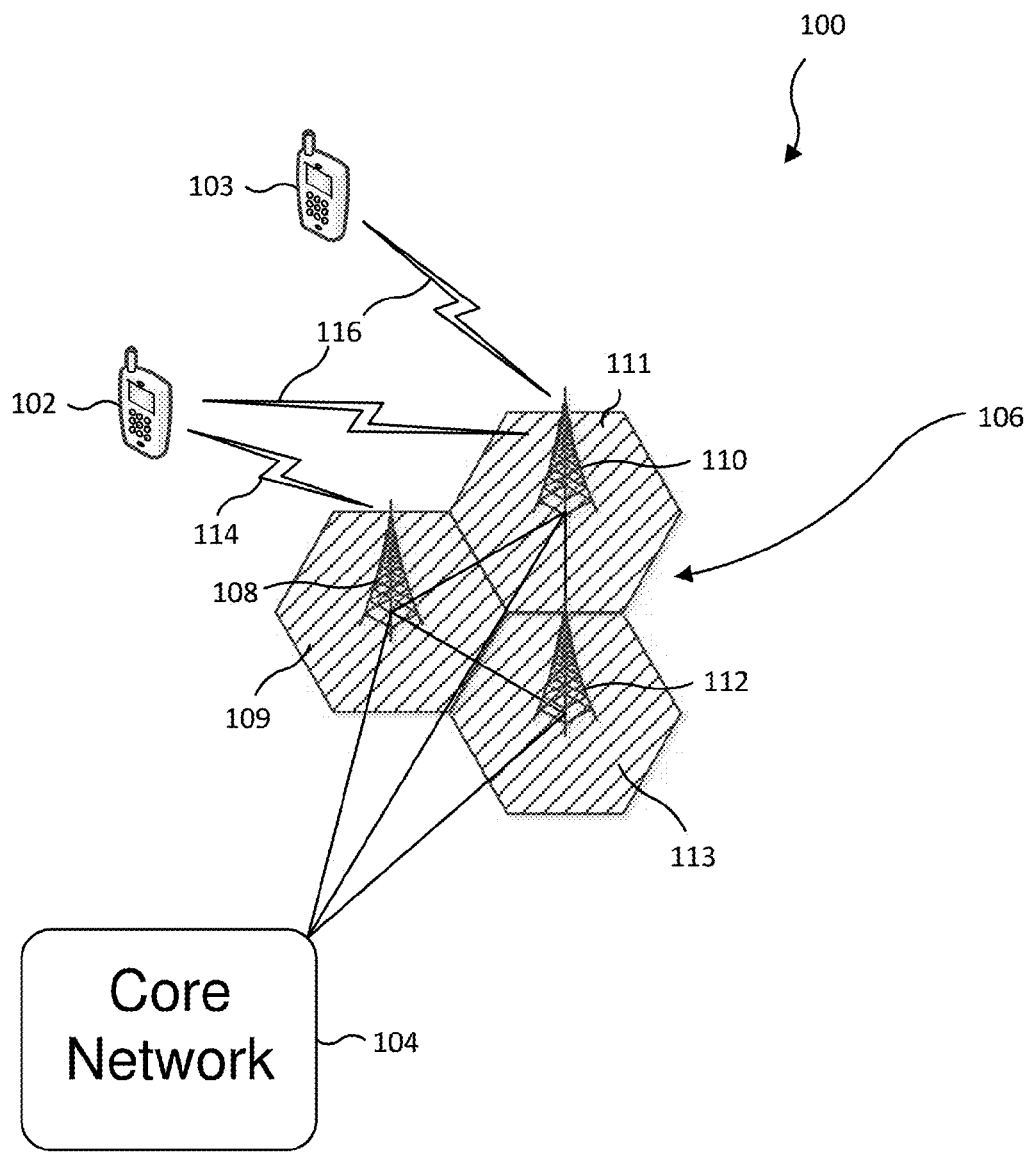
FIG. 1 shows a schematic drawing of a mobile radio communication system, a first wireless mobile device according to an example and a second wireless mobile device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

A communication device may receive a signal that includes an interference signal of a High-Speed Downlink Packet Access (HSDPA) communication standard. The interference signal may disturb a connection of the communication device to a base station. Further, it may be difficult to remove the interference signal from the received signal since properties of the interference signal like a modulation scheme and a coding scheme may be unknown to the communication device. The communication device may detect a data packet of the interference signal and determine a key information that may allow the communication device to decode the interference signal so that the interference signal may be removed from the received signal.

Various aspects of this disclosure provide a communication device, including a receiver configured to receive a signal. Further, the communication device may include a determination circuit configured to determine a data packet of the received signal based on a predefined packet structure and to determine a coding and modulation scheme information of the data packet. Moreover, the communication device may include a decoder configured to determine a key information based on the coding and modulation scheme information. The decoder may be configured to decode a first portion of the data packet based on the key information, to determine a redundancy information of a second portion of the data packet and to verify a packet information of the first portion and the second portion based on the redundancy information. Further, the communication device may include a detection circuit configured to detect an interference signal of the received signal and to activate the decoder if the interference signal is detected. Thus, the communication device may be configured to determine the key information of an interference signal in an effective and reliable manner. Further, the communication device may be configured to decode interference signals based on the key information so that the interference signal may be subtracted from the received signal. The received signal may further include a target signal that may have an improved signal to noise ratio and that may be reliably decoded. In an example, the key information may be at least one of a code or a bit sequence. Further, the decoder may be configured to decode the second portion to determine a transport block size and a redundancy version information. The target signal may be Turbo decoded based on the transport block size and the redundancy version information. The target signal may be a High Speed Downlink Shared Channel (HS-DSCH) signal.

In an example, the detection of the interference signal may include a determination of a plurality of despreaded signals by despreading the received signal in accordance with a plurality of spreading codes of a High-Speed Downlink Packet Access (HSDPA) communication standard, respectively. Thus, the detection circuit may be configured to exclude interference signals that are not signals in accordance with the HSDPA communication standard. Further, the detection circuit may be configured to include all possible interference signals in accordance the HSDPA communication standard.

In an example, the detection of the interference signal may include a demodulation of the despreaded signals in accordance with a Quadrature Phase Shift Keying modulation scheme. Thus, the detection circuit may be configured to exclude interference signals that are not signals in accordance with a High Speed Shared Control Channel (HS-SCCH).

In an example, the detection of the interference signal may include the determination of symbol powers of the despreaded signals of the plurality of despreaded signals, the determination of noise powers of the despreaded signals of the plurality of despreaded signals and comparisons of the symbol powers and the noise powers, respectively. Thus, the communication device may be configured to determine active channels easily and effectively.

Various aspects of this disclosure provide a communication device including a receiver configured to receive a signal. Further, the communication device may include a determination circuit configured to determine a data packet of the received signal based on a predefined packet structure and to determine a coding and modulation scheme information of the data packet. Moreover, the communication device may include a decoder configured to determine a key information based on the coding and modulation scheme information. The decoder may be configured to decode a first portion of the data packet based on the key information, to determine a redundancy information of a second portion of the data packet and to verify a packet information of the first portion and the second portion based on the redundancy information. Further, the decoder may be configured to decode an interference signal of the received signal based on the key information. Thus, the communication device may be configured to determine the key information of an interference signal in an effective and reliable manner. Further, the communication device may be configured to easily remove the interference signal from the received signal by reconstructing the interference signal based on the determined key information.

In an example, the communication device may further include a detection circuit configured to detect the interference signal of the received signal. Further, the decoder may be configured to determine the key information if the interference signal is detected. Thus the communication device may be energy efficient.

In an example, the predefined packet structure may be a packet structure in accordance with a High Speed Shared Control Channel of a High-Speed Downlink Packet Access communication standard. Thus, the communication device may be efficient.

In an example, the predefined packet structure may be a packet structure of a type one data packet in accordance with the High Speed Shared Control Channel.

In an example, the determination circuit may be configured to determine the data packet based on despreading and demodulating the received signal. Further, the decoder may be configured to determine a convolution signal based on the coding and modulation scheme information and to determine an exclusive disjunction signal based on an exclusive disjunction of the convolution signal and the first portion of the data packet. Moreover, the communication device may include a Viterbi decoder configured to decode the exclusive disjunction signal. The key information may be the decoded exclusive disjunction signal. Thus, the communication device may be efficient.

In an example, the coding and modulation scheme information may include a spreading code information of the data packet and a modulation scheme information of the data packet. The key information may be a user equipment identity information.

In an example, the decoder may be configured to decode the first portion of the data packet based on a predefined first coding scheme of the first portion and the second portion of the data packet based on a predefined second coding scheme of the second portion. The first coding scheme may be an exclusive disjunction operation of first information data of the first portion and packet coding data that may include the key information. The second coding scheme may be an exclusive disjunction operation of second information data that may include the redundancy information and the packet coding data. Thus, the communication device may be simple and efficient. The exclusive disjunction operation may be an exclusive or operation.

In an example, the decoder may be configured to determine the key information based on the packet coding data if the packet information of the first portion and the second portion is verified based on the redundancy information such that the redundancy information is consistent with the packet information. Thus, the communication device may be reliable.

In an example, the decoder may be configured to determine a matching key information from a plurality of key information. The matching key information may be the key information if the redundancy information is consistent with the packet information. Thus, the communication device may be determining the key information reliably and efficiently. The decoder may be configured to determine the matching key information by decoding the first portion based on each test key information of the plurality of key information, determining the redundancy information based on the each test key information and verifying if the determined redundancy information is consistent with the packet information of the decoded first portion and the second portion. The plurality of key information may be the plurality of all possible 16 bit code words.

In an example, the decoder may be configured to determine the key information by convolutionally decoding the packet coding data.

In an example, the redundancy information may be a cyclic redundancy check information of the decoded first portion and the second portion of the data packet.

In an example, the communication device may further include a memory circuit configured to store at least one key information. Further, the decoder may be configured to store the key information in the memory circuit. Thus, the key information may be reused in the decoding of other data packets.

In an example, the decoder may be configured to select the matching key information from the stored at least one key information based on a first selection hypothesis. Thus the communication device may be effective and efficient. The first selection hypothesis may be a likelihood test of all possible information bits of the plurality of key information. In an example, the likelihood test may include the time from the last successful decoding operation of a code of the plurality of key information. Moreover, the selection hypothesis may be a test if a code of the plurality of key information has been used already on a subframe of the determined data packet. Further, the decoder may be configured to select the matching key information from the stored at least one key information based on a plurality of selection hypotheses.

In an example, the decoder may be configured to determine an interference signal information of the decoded first portion. Further, the decoder may be configured to decode the interference signal based on the interference signal information. Thus, the received signal may have an improved signal to noise ratio and may be reliably decoded. Further, the interference signal may be decoded based on the determined key information.

Furthermore, a method for signal determination is provided that may include receiving a signal. Further, the method may include determining a data packet of the received signal based on a predefined packet structure and a coding and modulation scheme information of the data packet. Moreover, the method may include determining a key information based on the coding and modulation scheme information. Further, the method may include decoding a first portion of the data packet based on the key information. Moreover, the method may include determining a redundancy information of a second portion of the data packet. Further, the method may include verifying a packet information of the first portion and the second portion based on the redundancy information. Moreover, the method may include detecting an interference signal of the received signal. Further, the method may include activating the decoder if the interference signal is detected.

Furthermore, a method for signal determination is provided that may include receiving a signal. Further, the method may include determining a data packet of the received signal based on a predefined packet structure and a coding and modulation scheme information of the data packet. Moreover, the method may include determining a key information based on the coding and modulation scheme information. Further, the method may include decoding a first portion of the data packet based on the key information. Moreover, the method may include determining a redundancy information of a second portion of the data packet. Further, the method may include verifying a packet information of the first portion and the second portion based on the redundancy information. Moreover, the method may include decoding an interference signal of the received signal based on the key information.

It should be noted that aspects described in the context of the previous examples may be analogously valid for the above provided methods.

FIG. 1 shows a schematic drawing of a mobile radio communication system 100 based on a High Speed Downlink Packet Access (HSDPA) communications protocol of a Universal Mobile Telecommunications System (UMTS) communication standard, a first wireless mobile device 102 according to an example and a second wireless mobile device 103. The mobile radio communication system 100 may have a core network 104 and a radio access network 106 that may include several UMTS base stations from which a first base station 108 of a first cell 109, a second base station 110 of a second cell 111 and a third base station 112 of a third cell 113 are shown. The base stations 108, 110, 112 may be connected with each other and with the core network 104, respectively. Further, the first base station 108 may transmit a first signal 114 to the first wireless mobile device 102 and the second base station 110 may transmit a second signal 116 to the second wireless mobile device 103. The first wireless mobile device 102 may be configured to receive a first radio frequency signal including a superposition of the first signal 114 and the second signal 116. The second signal 116 may be referenced as interference signal.

Figure 2:
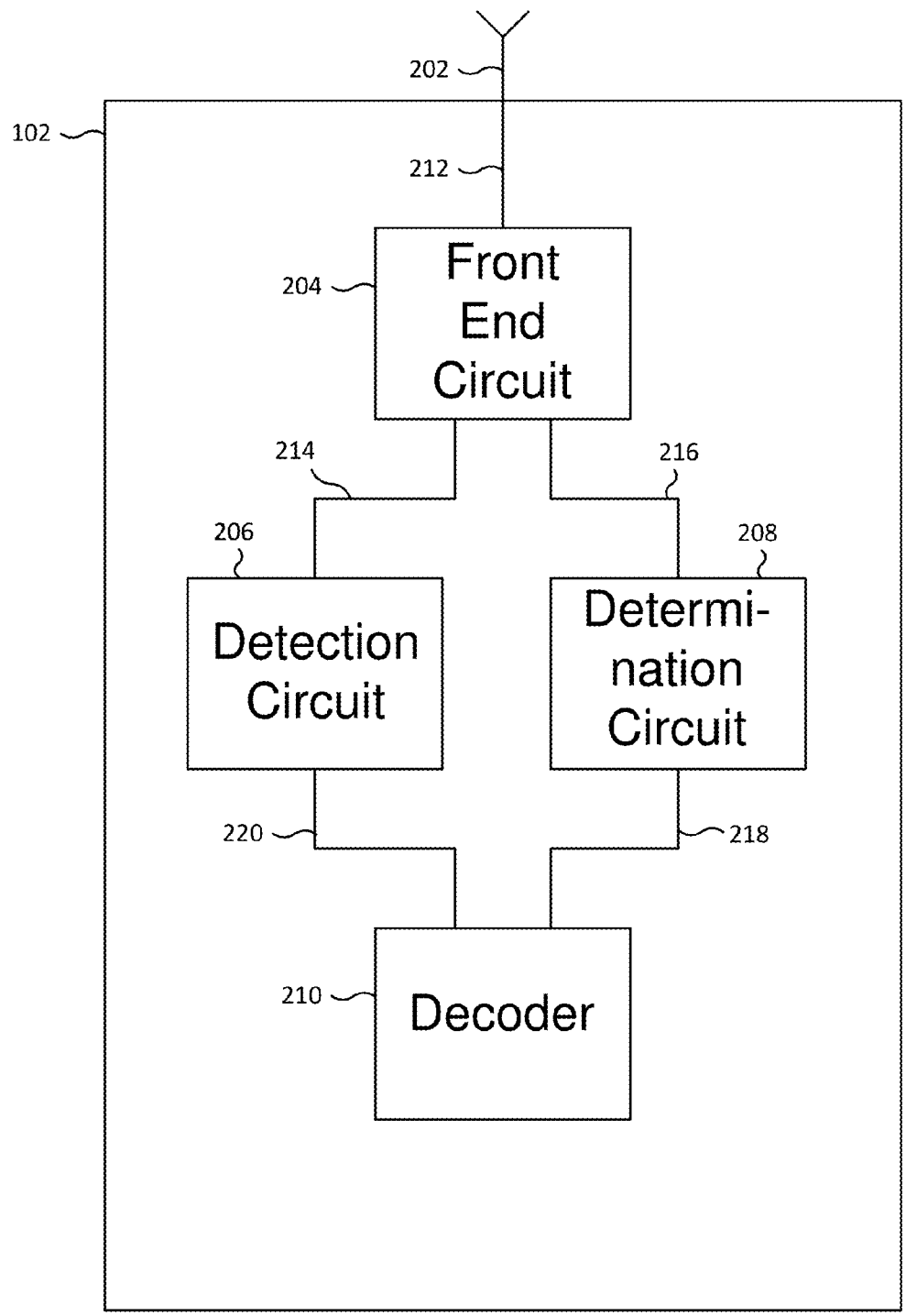
FIG. 2 shows a schematic drawing of the first wireless mobile device.

FIG. 2 shows a schematic drawing of the first wireless mobile device 102. The first wireless mobile device 102 may include an antenna 202, a front end circuit 204, a detection circuit 206, a determination circuit 208 and a decoder 210. The antenna 202 may be configured to receive the first radio frequency signal and to transmit the received signal to the front end circuit 204 via a first connection 212 that may connect the antenna 202 and the front end circuit 204. The front end circuit 204 may be configured to convert the received signal to a first baseband signal and to transmit the first baseband signal to the detection circuit 206 via a second connection 214 and to the determination circuit 208 via a third connection 216. The second connection 214 may connect the front end circuit 204 and the detection circuit 206. The third connection 216 may connect the front end circuit 204 and the determination circuit 208.

The determination circuit 208 may be configured to determine a first spreading code of the received first baseband signal. In an example, the determination circuit 208 may be configured to determine the spreading code based on despreading the received first baseband signal with respect to a plurality of spreading codes, respectively. The spreading codes may be spreading codes of a High Speed Downlink Shared Channel (HS-DSCH). Moreover, the determination circuit 208 may be configured to determine powers of the despreaded signals, respectively, to determine a first power to be a power of a first despreaded signal that exceeds a threshold power and to determine the first spreading code to be the spreading code that the first despreaded signal is despreaded with. The threshold power may be at least as high as a noise power of the despreaded signal. Further, the determination circuit 208 may be configured to determine a modulation information of the first despreaded signal.

Moreover, the determination circuit 208 may be configured to determine a data packet of a High Speed Shared Control Channel (HS-SCCH) based on a predefined packet structure. The predefined packet structure may be a packet structure based on a type one data packet in accordance with the HSDPA communications protocol. Further, the type one data packet may include a first portion and a second portion. The first portion and the second portion may be coded in accordance with a convolutional coding. Further, the first portion may include a convolution of information data in accordance with a convolutional coding that may be masked with a convolution of a user equipment identity information in accordance with the convolutional coding. The masking of the information data may be based on the determination of exclusive disjunctions of bits of the information data and bits of the user equipment identity information, respectively. The user equipment identity information may be associated with the second wireless mobile device 103 and may be a key information. Moreover, the user equipment identity information may be 16 bits.

Further, the second portion may include a cyclic redundancy check information that may be masked with the user equipment identity information. Further, the masking may be based on the determination of exclusive disjunctions of bits of a convolutionally coded cyclic redundancy check information and bits of a convolutionally coded user equipment identity information, respectively.

Moreover, the determination circuit 208 may be configured to determine the data packet based on a predefined number of symbols in accordance with the type one data packet. Further, the determination circuit 208 may be configured to transmit the determined data packet to the decoder 210 via a fourth connection 218.

Moreover, the detection circuit 206 may be configured to determine despreaded signals of the received first baseband signal in accordance with spreading codes of a High Speed Shared Control Channel (HS-SCCH). Further, the detection circuit 206 may be configured to determine symbols of each despreaded signal and to determine a mean power of the symbols of the despreaded signal.

Further, the detection circuit 206 may be configured to determine a noise power of a Common Pilot Channel (CPICH) signal of the received signal based on despreading the CPICH signal, subtracting predefined symbols of the CPICH signal and determining a scaled power of the subtracted CPICH signal. The detection circuit 206 may be configured to determine the noise power by scaling the scaled power based on a spreading factor of the spreading codes.

Moreover, the detection circuit 206 may be configured to determine that an active High Speed Shared Control Channel (HS-SCCH) is included in the received signal and to activate the decoder 210 via a fifth connection 220 that may connect the detection circuit 206 and the decoder 210.

Figure 3:
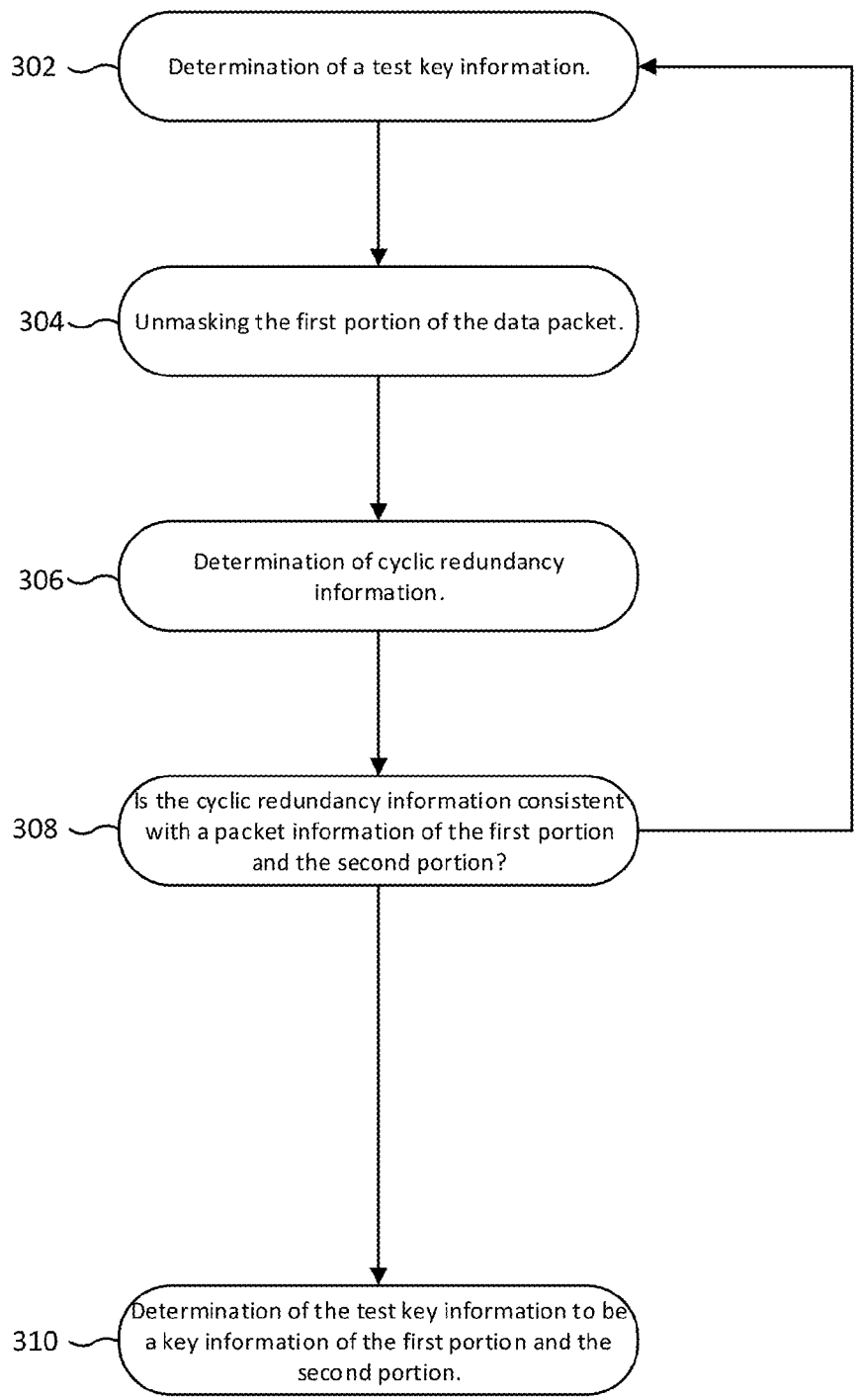
FIG. 3 shows a flow diagram of a determination of the user equipment identity information that the decoder may be configured to determine.

FIG. 3 shows a flow diagram of a determination of the user equipment identity information that the decoder 210 may be configured to determine. The decoder 210 may be configured to perform iteration processes of an iteration that may be associated with test key information of a plurality of test key information that may be based on a structure of the user equipment identity information. The structure may be a number of bits of the user equipment identity information.

In 302, the decoder 210 may be configured to determine a convolution signal by a convolution of the modulation information and the spreading code information in accordance with the convolutional coding. Further, the decoder 210 may be configured to determine an exclusive disjunction signal based on an exclusive disjunction of the convolution signal and the first portion of the data packet. Moreover, the decoder may be configured to decode the exclusive disjunction signal and to determine the test key information to be the decoded exclusive disjunction signal. As an alternative, the decoder may comprise a Viterbi decoder that is configured to decode the exclusive disjunction signal. The determination of the first test key information may be the beginning of a first iteration process of the iteration.

In 304, the decoder 210 may be configured to decode the first portion by unmasking the first portion based on the first test key information. The unmasking may be the determination of exclusive disjunctions of bits of the first portion and bits of the first test key information, respectively.

In 306, the decoder 210 may be configured to determine redundancy bits of the second portion, to unmask the redundancy bits based on the first test key information and to determine a first cyclic redundancy information based on the unmasked redundancy bits.

In 308, the decoder 210 may be configured to verify if the first cyclic redundancy information is consistent with a packet information of the unmasked first portion and the second portion. The verification of 308 may be the end of the first iteration process.

If the first cyclic redundancy information is consistent with the packet information of the unmasked first portion and the second portion the decoder 210 may be configured to determine, in 310, the first test key information to be the user equipment identity information. In an example, the packet information may be at least one of a channelization code set information or a modulation information.

If the first cyclic redundancy information is not consistent with the packet information of the unmasked first portion and the second portion the decoder 210 may be configured to determine a second test key information based on the structure of the user equipment identity information and a second iteration process of the iteration with the second test key information instead of the first test key information. Further, the decoder 210 may be configured to determine a second unmasked first portion by decoding the first portion based on the second test key information in 304, to determine a second cyclic redundancy information based on the second test key information in 306 and to verify if the second cyclic redundancy information is consistent with a second packet information of the data packet in 308. The verification in 308 may be the end of the second iteration process.

Further, the decoder 210 may be configured to determine a next test key information of the plurality of test key information associated with a next iteration process of the iteration if the cyclic redundancy information and the packet information that the decoder 210 may be configured to determine in a previous iteration process are not consistent.

Figure 4:
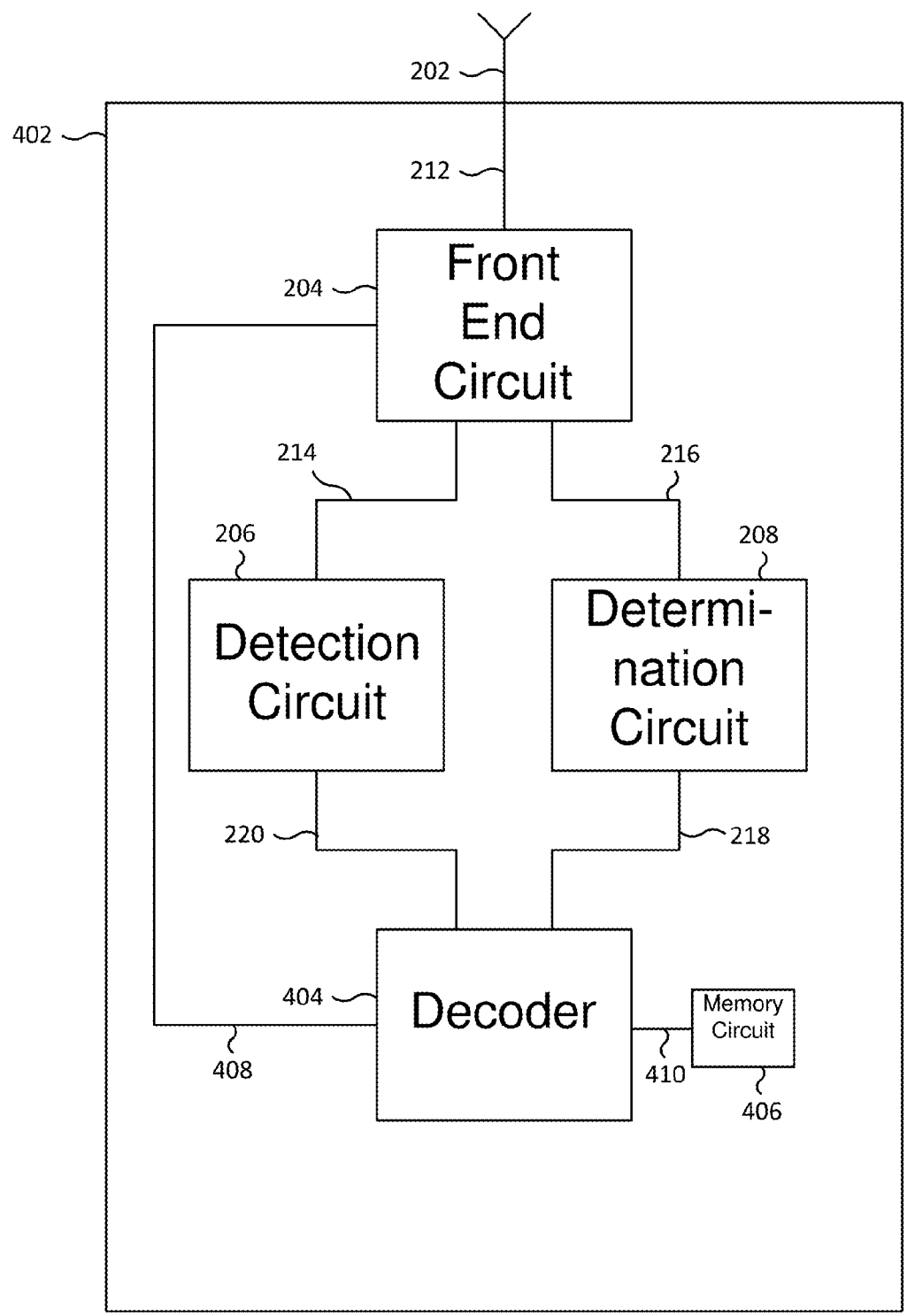
FIG. 4 shows a schematic drawing of a third wireless mobile device according to an example.

FIG. 4 shows a schematic drawing of a third wireless mobile device 402 according to an example. Features of the example of FIG. 4 that correspond to those of the example of FIG. 1 to FIG. 3 are indicated by the same reference numerals.

The third wireless mobile device 402 may include the antenna 202, a front end circuit 204, the detection circuit 206, the determination circuit 208, a decoder 404 and a memory circuit 406. The front end circuit 204 may be connected with the decoder 404 via a sixth connection 408. The decoder 404 may be connected with the memory circuit 406 via a seventh connection 410.

Further, the determination circuit 208 may be configured to determine data packets of baseband signals and to transmit the data packets to the decoder 404. The decoder 404 may be configured to determine at least one key information of the data packets as the decoder 404, respectively, and to store the determined at least one key information in the memory circuit 406. Further, the decoder 404 may be configured to determine coding and modulation scheme information of the data packets and to store the coding and modulation scheme information in the memory circuit 406.

Further, the antenna 202 may be configured to receive a second radio frequency signal that includes an interference signal in accordance with a High-Speed Downlink Shared Channel (HS-DSCH) communication protocol and to transmit the second radio frequency signal to the front end circuit 204. The front end circuit 204 may be configured to determine a second baseband signal based on the second radio frequency signal and to transmit the second baseband signal to the decoder 404.

The decoder 404 may be configured to receive at least one coding and modulation scheme information of the memory circuit 406, to select a matching coding and modulation scheme information based on the second baseband signal and to decode the interference signal in accordance with the HS-DSCH communication protocol based on the matching coding and modulation scheme information.

Moreover, the decoder 404 may be configured to determine a subtracted signal based on a subtraction of the decoded interference signal from the second baseband signal. The subtracted signal may include a target signal transmitted to the third wireless mobile device 402. The target signal of the subtracted signal may be decoded by a Turbo decoder of the third wireless mobile device 402 based on the transport block size and redundancy version information. All other aspects of the example of FIG. 4 correspond to those of the example of FIG. 1 to FIG. 3.

Figure 5:
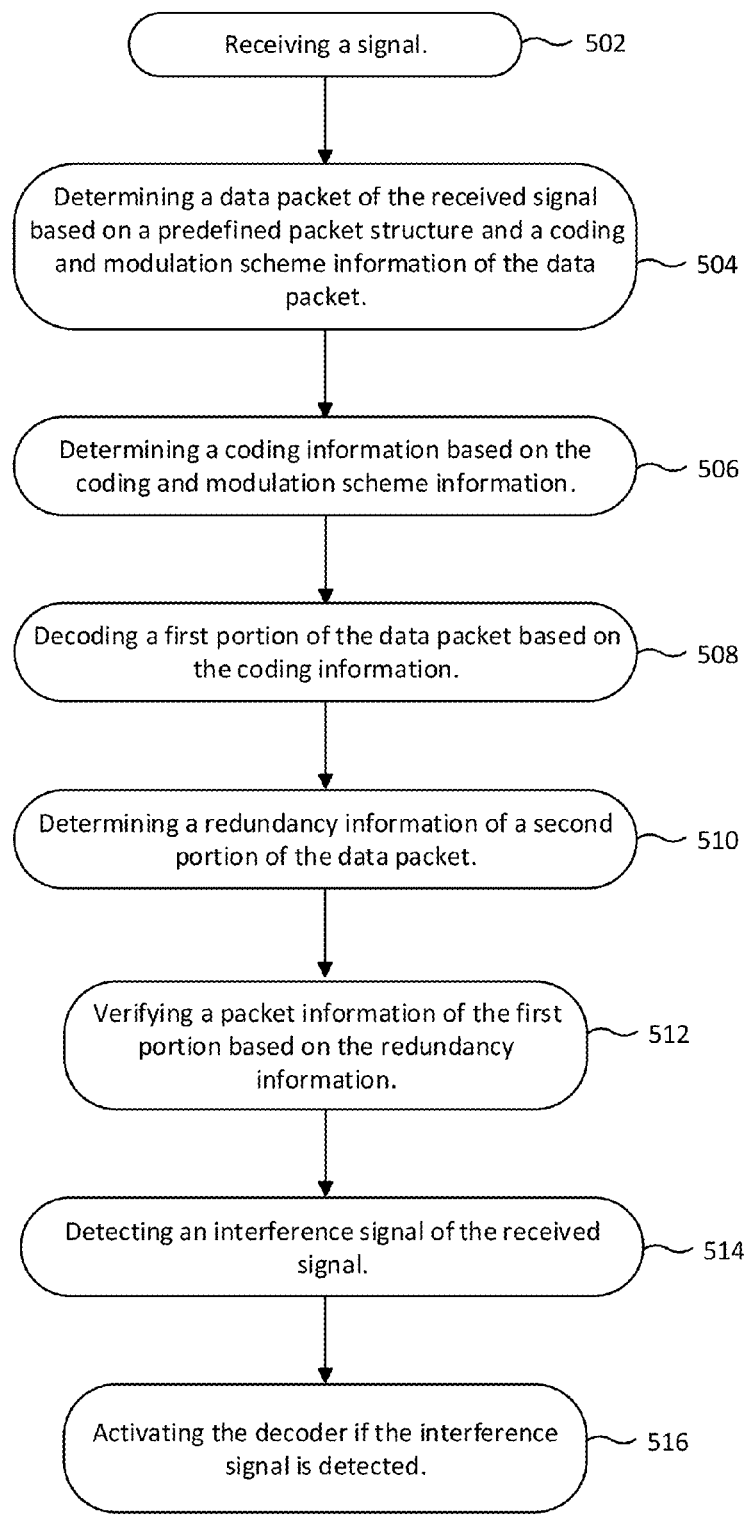
FIG. 5 shows a method for signal determination according to an example.

FIG. 5 shows a method for signal determination according to an example. The method may include, in 502, receiving a signal.

Further, the method may include, in 504, determining a data packet of the received signal based on a predefined packet structure and a coding and modulation scheme information of the data packet.

Moreover, the method may include, in 506, determining a key information based on the coding and modulation scheme information.

Further, the method may include, in 508, decoding a first portion of the data packet based on the key information.

Moreover, the method may include, in 510, determining a redundancy information of a second portion of the data packet.

Further, the method may include, in 512, verifying a packet information of the first portion and the second portion based on the redundancy information.

Moreover, the method may include, in 514, detecting an interference signal of the received signal.

Further, the method may include, in 516, activating the decoder if the interference signal is detected.

Figure 6:
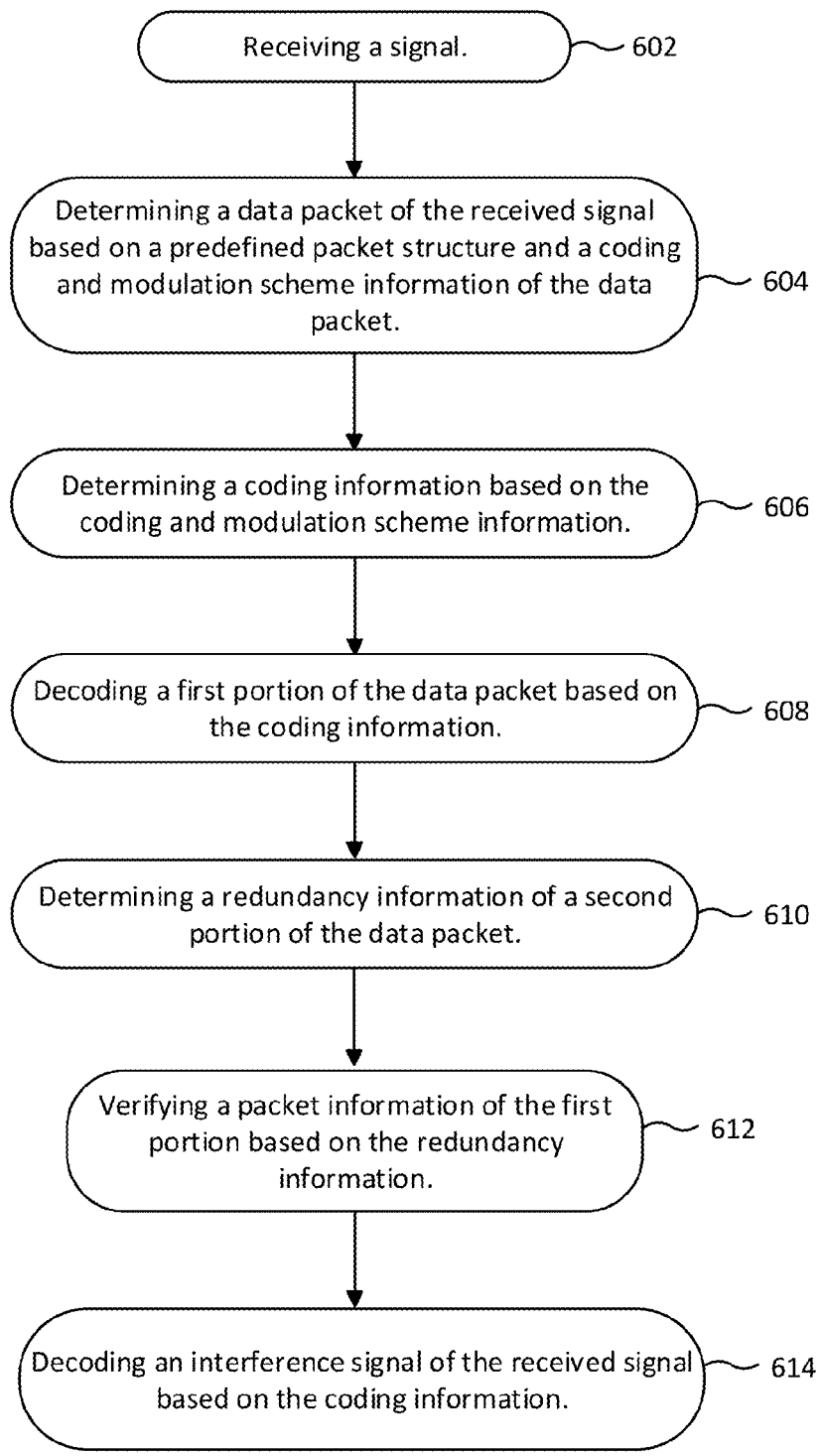
FIG. 6 shows a method for signal determination according to an example.

FIG. 6 shows a method for signal determination according to an example. The method may include, in 602, receiving a signal.

Further, the method may include, in 604, determining a data packet of the received signal based on a predefined packet structure and a coding and modulation scheme information of the data packet.

Moreover, the method may include, in 606, determining a key information based on the coding and modulation scheme information.

Further, the method may include, in 608, decoding a first portion of the data packet based on the key information.

Moreover, the method may include, in 610, determining a redundancy information of a second portion of the data packet.

Further, the method may include, in 612, verifying a packet information of the data packet based on the redundancy information.

Moreover, the method may include, in 614, decoding an interference signal of the received signal based on the key information.

It should be noted that aspects described in the context of the wireless mobile devices according to the examples of FIG. 1 to FIG. 4 are analogously valid for the methods that are illustrated based on FIG. 5 and FIG. 6.

In the following, various aspects of this disclosure will be illustrated:

Example 1 is a communication device that may include a receiver configured to receive a signal, a determination circuit configured to determine a data packet of the received signal based on a predefined packet structure and to determine a coding and modulation scheme information of the data packet and a decoder configured to determine a key information based on the coding and modulation scheme information. The decoder may be configured to decode a first portion of the data packet based on the key information, to determine a redundancy information of a second portion of the data packet and to verify a packet information of the data packet based on the redundancy information. The communication device may further include a detection circuit configured to detect an interference signal of the received signal and to activate the decoder if the interference signal is detected.

In Example 2, the subject matter of Example 1 can optionally include that the detection of the interference signal may include a determination of a plurality of despreaded signals by despreading the received signal in accordance with a plurality of spreading codes of a High-Speed Downlink Packet Access communication standard, respectively.

In Example 3, the subject matter of Example 2 can optionally include that the detection of the interference signal may include a demodulation of the despreaded signals in accordance with a Quadrature Phase Shift Keying modulation scheme.

In Example 4, the subject matter of any one of Examples 1 to 2 can optionally include that the detection of the interference signal may include the determination of symbol powers of the despreaded signals of the plurality of despreaded signals, the determination of noise powers of the despreaded signals of the plurality of despreaded signals and comparisons of the symbol powers and the noise powers, respectively.

Example 5 is a communication device that may include a receiver configured to receive a signal, a determination circuit configured to determine a data packet of the received signal based on a predefined packet structure and to determine a coding and modulation scheme information of the data packet and a decoder configured to determine a key information based on the coding and modulation scheme information. The decoder may be configured to decode a first portion of the data packet based on the key information, to determine a redundancy information of a second portion of the data packet and to verify a packet information of the first portion and the second portion based on the redundancy information. The decoder may further be configured to decode an interference signal of the received signal based on the key information.

In Example 6, the subject matter of Example 5 can optionally include that the communication device may further include a detection circuit configured to detect the interference signal of the received signal. The decoder may be configured to determine the key information if the interference signal is detected.

In Example 7, the subject matter of Examples 6 can optionally include that the detection of the interference signal may include a determination of a plurality of despreaded signals by despreading the received signal in accordance with a plurality of spreading codes of a High-Speed Downlink Packet Access communication standard, respectively.

In Example 8, the subject matter of Example 7 can optionally include that the detection of the interference signal may include a demodulation of the despreaded signals in accordance with a Quadrature Phase Shift Keying modulation scheme.

In Example 9, the subject matter of any one of Examples 7 to 8 can optionally include that the detection of the interference signal may include the determination of symbol powers of the despreaded signals of the plurality of despreaded signals, the determination of noise powers of the despreaded signals of the plurality of despreaded signals and comparisons of the symbol powers and the noise powers, respectively.

In Example 10, the subject matter of any one of Examples 1 to 9 can optionally include that the predefined packet structure may be a packet structure in accordance with a High Speed Shared Control Channel of a High-Speed Downlink Packet Access communication standard.

In Example 11, the subject matter of Example 10 can optionally include that the predefined packet structure may be a packet structure of a type one data packet in accordance with the High Speed Shared Control Channel.

In Example 12, the subject matter of any one of Examples 1 to 11 can optionally include that the determination circuit may be configured to determine the data packet based on despreading and demodulating the received signal. The decoder may be configured to determine a convolution signal based on the coding and modulation scheme information and to determine an exclusive disjunction signal based on an exclusive disjunction of the convolution signal and the first portion of the data packet. The communication device further may include a Viterbi decoder configured to decode the exclusive disjunction signal. The key information may be the decoded exclusive disjunction signal.

In Example 13, the subject matter of any one of Examples 1 to 12 can optionally include that the coding and modulation scheme information may include a spreading code information of the data packet and a modulation scheme information of the data packet.

In Example 14, the subject matter of any one of Examples 1 to 13 can optionally include that the decoder may be configured to decode the first portion of the data packet based on a predefined first coding scheme of the first portion and the second portion of the data packet based on a predefined second coding scheme of the second portion. The first coding scheme may be an exclusive disjunction operation of first information data of the first portion and packet coding data that may include the key information. The second coding scheme may be an exclusive disjunction operation of second information data that include the redundancy information and the packet coding data.

In Example 15, the subject matter of Example 14 can optionally include that the decoder may be configured to determine the key information based on the packet coding data if the packet information of the first portion and the second portion is verified based on the redundancy information such that the redundancy information matches the packet information.

In Example 16, the subject matter of Example 15 can optionally include that the decoder may be configured to determine a matching key information from a plurality of key information. The matching key information may be the key information if the redundancy information is consistent with the packet information.

In Example 17, the subject matter of any one of Examples 14 to 16 can optionally include that the decoder may be configured to determine the key information based on a convolutional coding of the packet coding data.

In Example 18, the subject matter of any one of Examples 1 to 17 can optionally include that the redundancy information may be a cyclic redundancy check information of the decoded first portion and the second portion of the data packet.

In Example 19, the subject matter of any one of Examples 1 to 18 can optionally include that the communication device may further include a memory circuit configured to store at least one key information. The decoder may be configured to store the key information in the memory circuit.

In Example 20, the subject matter of Example 19 can optionally include that the decoder may be configured to select the matching key information from the stored at least one key information based on a first selection hypothesis.

In Example 21, the subject matter of any one of Examples 1 to 20 can optionally include that the decoder may be configured to determine an interference signal information of the decoded first portion. The decoder may be configured to decode the interference signal based on the interference signal information.

Example 22 is a method for signal determination that may include receiving a signal, determining a data packet of the received signal based on a predefined packet structure and a coding and modulation scheme information of the data packet, determining a key information based on the coding and modulation scheme information, decoding a first portion of the data packet based on the key information, determining a redundancy information of a second portion of the data packet, verifying a packet information of the first portion and the second portion based on the redundancy information, detecting an interference signal of the received signal and activating the decoder if the interference signal is detected.

In Example 23, the subject matter of Example 22 can optionally include that the detection of the interference signal may include determining a plurality of despreaded signals by despreading the received signal in accordance with a plurality of spreading codes of a High-Speed Downlink Packet Access communication standard, respectively.

In Example 24, the subject matter of Example 23 can optionally include that the detection of the interference signal may include demodulating the despreaded signals in accordance with a Quadrature Phase Shift Keying modulation scheme.

In Example 25, the subject matter of any one of Examples 23 to 24 can optionally include that the detection of the interference signal may include determining symbol powers of the despreaded signals of the plurality of despreaded signals, determining noise powers of the despreaded signals of the plurality of despreaded signals and comparing the symbol powers and the noise powers, respectively.

Example 26 is a method for signal determination that may include receiving a signal, determining a data packet of the received signal based on a predefined packet structure and a coding and modulation scheme information of the data packet, determining a key information based on the coding and modulation scheme information, decoding a first portion of the data packet based on the key information, determining a redundancy information of a second portion of the data packet, verifying a packet information of the first portion and the second portion based on the redundancy information and decoding an interference signal of the received signal based on the key information.

In Example 27, the subject matter of Example 26 can optionally include that the method may further include detecting the interference signal of the received signal and determining the key information if the interference signal is detected.

In Example 28, the subject matter of Example 27 can optionally include that the detection of the interference signal may include determining a plurality of despreaded signals by despreading the received signal in accordance with a plurality of spreading codes of a High-Speed Downlink Packet Access communication standard, respectively.

In Example 29, the subject matter of Example 28 can optionally include that the detection of the interference signal may include demodulating the despreaded signals in accordance with a Quadrature Phase Shift Keying modulation scheme.

In Example 30, the subject matter of Example 29 can optionally include that the detection of the interference signal may include determining a symbol power of each despreaded signal of the plurality of despreaded signals, determining a noise power of the received signal and comparing the symbol power and the noise power.

In Example 31, the subject matter of any one of Examples 22 to 30 can optionally include that the predefined packet structure may be a packet structure in accordance with a High Speed Shared Control Channel of a High-Speed Downlink Packet Access communication standard.

In Example 32, the subject matter of Example 31 can optionally include that the predefined packet structure may be a packet structure of a type one data packet in accordance with the High Speed Shared Control Channel.

In Example 33, the subject matter of any one of Examples 22 to 32 can optionally include that the method may further include determining the data packet based on despreading and demodulating the received signal, determining a convolution signal based on the coding and modulation scheme information, determining an exclusive disjunction signal based on an exclusive disjunction of the convolution signal and the first portion of the data packet and decoding the exclusive disjunction signal by a Viterbi decoder. The key information may be the decoded exclusive disjunction signal.

In Example 34, the subject matter of Example 33 can optionally include that the coding and modulation scheme information may include a spreading code information of the data packet and a modulation scheme information of the data packet.

In Example 35, the subject matter of any one of Examples 22 to 34 can optionally include that the method may further include decoding the first portion of the data packet based on a predefined first coding scheme of the first portion and the second portion of the data packet based on a predefined second coding scheme of the second portion. The first coding scheme may be an exclusive disjunction operation of first information data of the first portion and packet coding data that may include the key information. The second coding scheme may be an exclusive disjunction operation of second information data that include the redundancy information and the packet coding data.

In Example 36, the subject matter of Example 35 can optionally include that the method may further include determining the key information based on the packet coding data if the packet information of the first portion and the second portion may be verified based on the redundancy information such that the redundancy information matches the packet information.

In Example 37, the subject matter of Example 36 can optionally include that the method may further include determining a matching key information from a plurality of key information. The matching key information may be the key information if the redundancy information is consistent with the packet information.

In Example 38, the subject matter of any one of Examples 35 to 37 can optionally include that the method may further include determining the key information based on a convolutional coding of the packet coding data.

In Example 39, the subject matter of any one of Examples 22 to 38 can optionally include that the redundancy information may be a cyclic redundancy check information of the decoded first portion and the second portion of the data packet.

In Example 40, the subject matter of any one of Examples 22 to 39 can optionally include that the method may further include storing at least one key information in a memory circuit.

In Example 41, the subject matter of Example 40 can optionally include that the method may further include selecting the matching key information from the stored at least one key information based on a first selection hypothesis.

In Example 42, the subject matter of any one of Examples 22 to 41 can optionally include that the method may further include determining an interference signal information of the decoded first portion and decoding the interference signal based on the interference signal information.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device; comprising:
   a receiver configured to receive a signal;
   a determination circuit configured to determine a data packet of the received signal based on a predefined packet structure and to determine a coding and modulation scheme information of the data packet;
   a decoder configured to determine a key information based on the coding and modulation scheme information,
   wherein the decoder is configured to decode a first portion of the data packet based on the key information, to determine a redundancy information of a second portion of the data packet and to verify a packet information of the data packet based on the redundancy information; and
   a detection circuit configured to detect an interference signal of the received signal and to activate the decoder if the interference signal is detected.

2. The communication device of claim 1,
   wherein the detection of the interference signal comprises a determination of a plurality of despreaded signals by despreading the received signal in accordance with a plurality of spreading codes of a High-Speed Downlink Packet Access communication standard, respectively.

3. The communication device of claim 2,
   wherein the detection of the interference signal comprises a demodulation of the despreaded signals in accordance with a Quadrature Phase Shift Keying modulation scheme.

4. The communication device of claim 3,
   wherein the detection of the interference signal comprises the determination of symbol powers of the despreaded signals of the plurality of despreaded signals, the determination of noise powers of the despreaded signals of the plurality of despreaded signals and comparisons of the symbol powers and the noise powers, respectively.

5. A communication device; comprising:
   a receiver configured to receive a signal;
   a determination circuit configured to determine a data packet of the received signal based on a predefined packet structure and to determine a coding and modulation scheme information of the data packet;
   a decoder configured to determine a key information based on the coding and modulation scheme information,
   wherein the decoder is configured to decode a first portion of the data packet based on the key information, to determine a redundancy information of a second portion of the data packet and to verify a packet information of the first portion and the second portion based on the redundancy information, and wherein the decoder is configured to decode an interference signal of the received signal based on the key information.

6. The communication device of claim 5, further comprising:
a detection circuit configured to detect the interference signal of the received signal,
wherein the decoder is configured to determine the key information if the interference signal is detected.

7. The communication device of claim 6,
wherein the detection of the interference signal comprises a determination of a plurality of despreaded signals by despreading the received signal in accordance with a plurality of spreading codes of a High-Speed Downlink Packet Access communication standard, respectively.

8. The communication device of claim 7,
wherein the detection of the interference signal comprises a demodulation of the despreaded signals in accordance with a Quadrature Phase Shift Keying modulation scheme.

9. The communication device of claim 8,
wherein the detection of the interference signal comprises the determination of symbol powers of the despreaded signals of the plurality of despreaded signals, the determination of noise powers of the despreaded signals of the plurality of despreaded signals and comparisons of the symbol powers and the noise powers, respectively.

10. The communication device of claim 9,
wherein the determination circuit is configured to determine the data packet based on despreading and demodulating the received signal;
wherein the decoder is configured to determine a convolution signal based on the coding and modulation scheme information and to determine an exclusive disjunction signal based on an exclusive disjunction of the convolution signal and the first portion of the data packet;
wherein the communication device further comprises a Viterbi decoder configured to decode the exclusive disjunction signal; and
wherein the key information is the decoded exclusive disjunction signal.

11. The communication device of claim 10,
wherein the coding and modulation scheme information comprises a spreading code information of the data packet and a modulation scheme information of the data packet.

12. The communication device of claim 11,
wherein the decoder is configured to decode the first portion of the data packet based on a predefined first coding scheme of the first portion and the second portion of the data packet based on a predefined second coding scheme of the second portion,
wherein the first coding scheme is an exclusive disjunction operation of first information data of the first portion and packet coding data that comprises the key information; and
wherein the second coding scheme is an exclusive disjunction operation of second information data that comprise the redundancy information and the packet coding data.

13. The communication device of claim 12
wherein the decoder is configured to determine the key information based on the packet coding data if the packet information of the first portion and the second portion is verified based on the redundancy information such that the redundancy information matches the packet information.

14. The communication device of claim 13,
wherein the decoder is configured to determine a matching key information from a plurality of key information; and
wherein the matching key information is the key information if the redundancy information is consistent with the packet information.

15. The communication device of claim 14, further comprising:
a memory circuit configured to store at least one key information,
wherein the decoder is configured to store the key information in the memory circuit.

16. The communication device of claim 15,
wherein the decoder is configured to select the matching key information from the stored at least one key information based on a first selection hypothesis.

17. A method for signal determination; comprising:
receiving a signal;
determining a data packet of the received signal based on a predefined packet structure and a coding and modulation scheme information of the data packet;
determining a key information based on the coding and modulation scheme information;
decoding a first portion of the data packet based on the key information;
determining a redundancy information of a second portion of the data packet;
verifying a packet information of the first portion and the second portion based on the redundancy information;
detecting an interference signal of the received signal; and
activating the decoder if the interference signal is detected.

18. The method of claim 17,
wherein the detection of the interference signal comprises:
determining a plurality of despreaded signals by despreading the received signal in accordance with a plurality of spreading codes of a High-Speed Downlink Packet Access communication standard, respectively.

19. The method of claim 18,
wherein the detection of the interference signal comprises:
determining symbol powers of the despreaded signals of the plurality of despreaded signals;
determining noise powers of the despreaded signals of the plurality of despreaded signals; and
comparing the symbol powers and the noise powers, respectively.

20. A method for signal determination; comprising:
receiving a signal;
determining a data packet of the received signal based on a predefined packet structure and a coding and modulation scheme information of the data packet;
determining a key information based on the coding and modulation scheme information;
decoding a first portion of the data packet based on the key information,
determining a redundancy information of a second portion of the data packet;
verifying a packet information of the first portion and the second portion based on the redundancy information; and decoding an interference signal of the received signal based on the key information.

21. The method of claim 20, further comprising:
detecting the interference signal of the received signal; and
determining the key information if the interference signal is detected.

22. The method of claim 21, further comprising:
determining the data packet based on despreading and demodulating the received signal;
determining a convolution signal based on the coding and modulation scheme information;
determining an exclusive disjunction signal based on an exclusive disjunction of the convolution signal and the first portion of the data packet;
decoding the exclusive disjunction signal by a Viterbi decoder; and
wherein the key information is the decoded exclusive disjunction signal.

23. The method of claim 22, further comprising:
decoding the first portion of the data packet based on a predefined first coding scheme of the first portion and the second portion of the data packet based on a predefined second coding scheme of the second portion,
wherein the first coding scheme is an exclusive disjunction operation of first information data of the first portion and packet coding data that comprises the key information, and
wherein the second coding scheme is an exclusive disjunction operation of second information data that comprise the redundancy information and the packet coding data.

24. The method of claim 23, further comprising:
determining the key information based on the packet coding data if the packet information of the first portion and the second portion is verified based on the redundancy information such that the redundancy information matches the packet information.

25. The method of claim 24, further comprising:
determining an interference signal information of the decoded first portion; and
decoding the interference signal based on the interference signal information.

* * * * *